(12) United States Patent
Hines

(10) Patent No.: US 7,682,639 B1
(45) Date of Patent: Mar. 23, 2010

(54) WATER PACKET

(76) Inventor: Stephen P. Hines, 1540 Wabasso Way, Glendale, CA (US) 91208

(*) Notice: Subject to any disclaimer, the term of this patent is extended or adjusted under 35 U.S.C. 154(b) by 195 days.

(21) Appl. No.: 11/904,174

(22) Filed: Sep. 26, 2007

(51) Int. Cl.
*A23L 2/00* (2006.01)
(52) U.S. Cl. .............................. 426/66; 383/25; 383/30; 312/31.01; 62/315
(58) Field of Classification Search .................. 426/66; 62/315; 383/25, 30; 312/31.01
See application file for complete search history.

(56) References Cited

U.S. PATENT DOCUMENTS

| | | | | |
|---|---|---|---|---|
| 1,083,873 | A * | 1/1914 | Burch | 383/68 |
| 3,595,468 | A * | 7/1971 | Repko | 206/0.84 |
| 5,908,649 | A * | 6/1999 | Floyd et al. | 426/109 |
| 6,488,146 | B1 * | 12/2002 | Dotsikas | 206/217 |
| 2002/0112499 | A1 * | 8/2002 | Goldfine | 62/316 |

OTHER PUBLICATIONS

Bag O Water demonstration, Bag O Water Canada [online] Dec. 2001 [retrieved on Jul. 7, 2009] Retrieved from the Internet Archive <URL: http://web.archive.org/web/20011220141828/www.bagowater.com/HOWWork.html>.*

Bag O Water index page, Bag O Water Canda [online] Dec. 2001 [retrieved on Jul. 7, 2009] Retrieved from the Internet Archive ,URL: <http://web.archive.org/web/20011203175814/http://www.bagowater.com/>.*

Datrex Emergency Drinking Water, Datrex, Inc. [on line] Feb. 2005 [retrieved on Jul. 7, 2009] Retrieved from the Internet Archive, URL: <http://web.archive.org/web/20050220065830/www.datrex.com/products/viewproduct.asp?pr=27&ca=21>.*

* cited by examiner

*Primary Examiner*—Rena L Dye
*Assistant Examiner*—Chaim Smith
(74) *Attorney, Agent, or Firm*—Roy L. Anderson; Wagner, Anderson & Bright, LLP

(57) ABSTRACT

A sealed, double walled water packet has an inner packet filled with potable water that has a porous outer surface layer containing absorbed water and an outer packet that encloses the inner packet and is connected to the inner layer. The inner packet (which may contain as little as a swallow of water) is connected to the outer packet (both of which can be made as envelopes with tearable sections or peel off corners) along one side or by a string so that the inner packet can be twirled or waved to cause rapid evaporation of water in the porous outer surface layer (which can include hydrogel) to thereby cool the potable water contained inside the inner packet before it is opened.

16 Claims, 3 Drawing Sheets

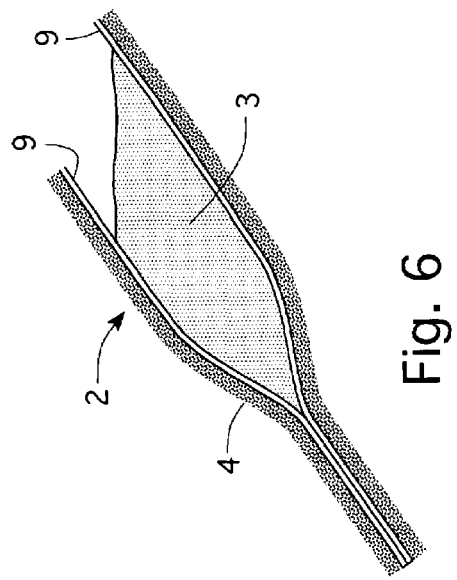
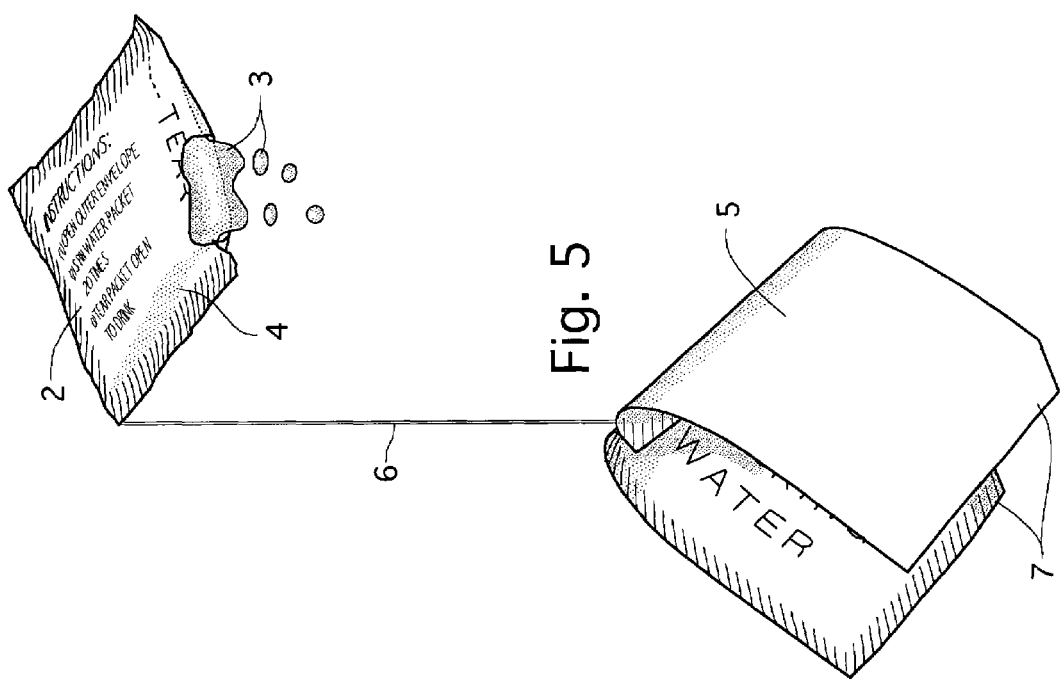
Fig. 5
Fig. 6

WATER PACKET

FIELD OF THE INVENTION

The present invention is in the field of disposable packages of potable water.

BACKGROUND OF THE INVENTION

Water covers more surface area of planet Earth than land, but that does not mean that water is always available for drinking since saltwater is not potable water suitable for drinking. Because of this fact, potable water is sold in prepackaged containers suitable for use in emergencies. Such prepackaged containers are deemed an essential emergency survival tool for many sea vessels, and the U.S. Coast Guard even has standards for such packaging.

There are other situations when potable water is also desirable, such as in deserts where potable water is lacking. In such situations, it is common to carry water in canteens, water bottles, water bags or other containers, and such containers commonly carry anywhere from twelve ounces to gallons of water. If such containers are filled with cool potable water, and the containers are insulated, they can retain their cooled temperature for some time, but not forever.

The present invention addresses the situation of a where a small amount of water may be desired or needed, but it is highly desirable that the water be cooled, and there is no ready cooling, mechanism available. For example, for a soldier in a desert environment, especially during the heat of day in an exposed location in hostile territory, a swallow of cold water can be highly desirable. This invention satisfies this need.

SUMMARY OF THE INVENTION

The present invention is generally directed to a water packet having an inner packet filled with potable water that has a porous outer surface layer containing absorbed water and an outer packet that encloses the inner packet and is connected to the inner layer.

In other, separate aspects of the present invention, the inner packet (which may contain as little as a swallow of water) is connected to the outer packet (both of which can be made as envelopes with tearable sections or peel off corners) along one side or by a string so that the inner packet can be twirled or waved to cause rapid evaporation of water in the porous outer surface layer (which can include hydrogel) to thereby cool the potable water contained inside the inner packet before it is opened.

Accordingly, it is a primary object of the present invention to provide a one-time use water packet with potable water that can be cooled by rapid evaporation. This and further objects and advantages will be apparent to those skilled in the art in connection with the drawings and the detailed description of the preferred embodiment set forth below.

BRIEF DESCRIPTION OF THE DRAWINGS

FIG. 5 illustrates the embodiment of FIG. 4 after it has been opened to access the potable water.

FIG. 6 is a partial cross section of the inner packet of the embodiment of FIG. 4.

DETAILED DESCRIPTION OF THE PRESENT INVENTION

Figure 1:
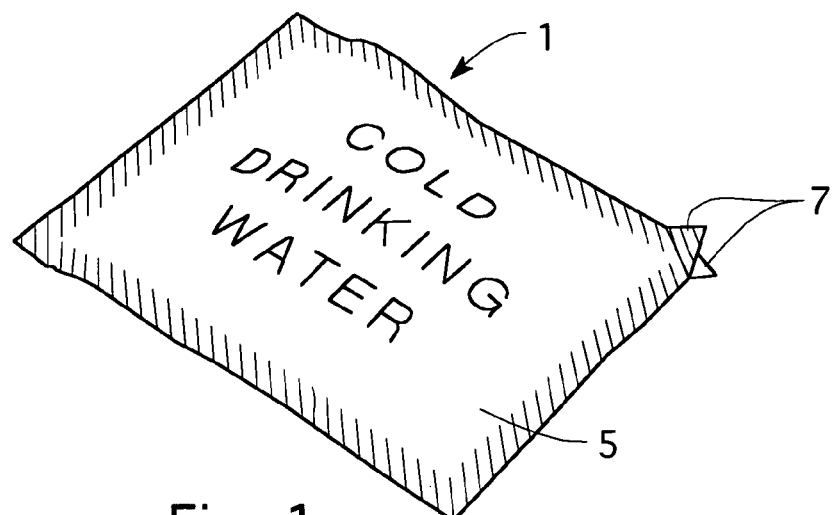
FIG. 1 illustrates a water packet according to the present invention.
Figure 2:
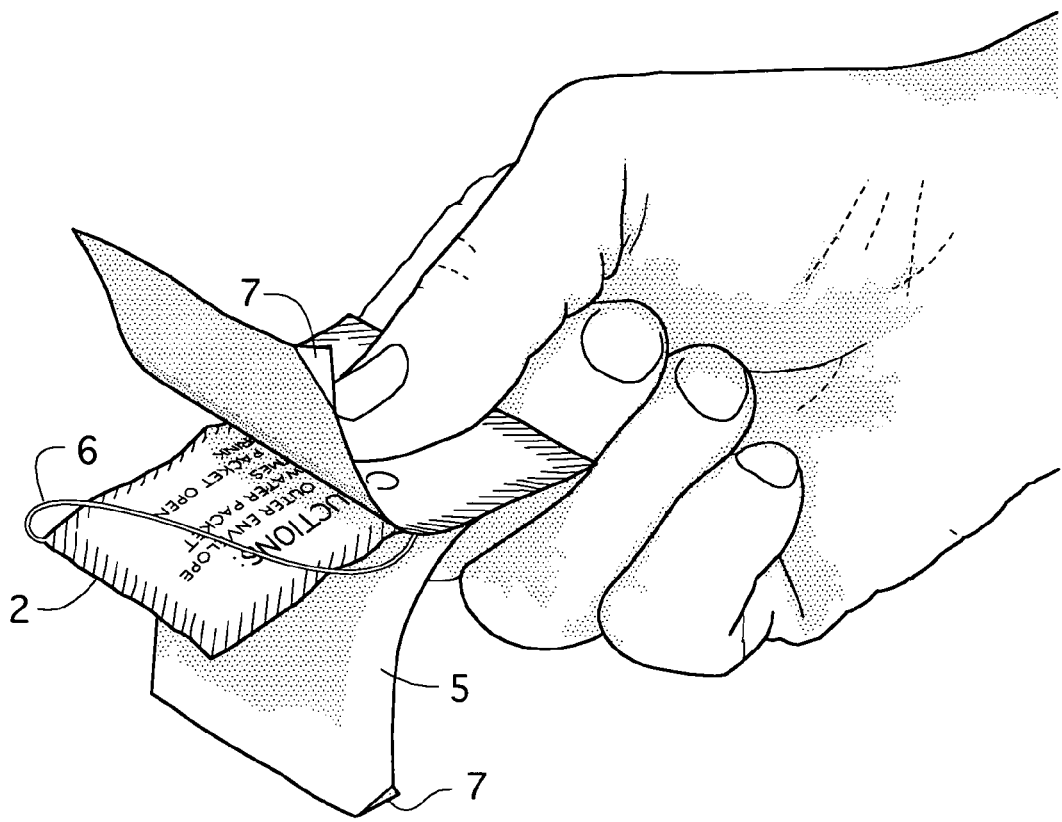
FIG. 2 illustrates an embodiment of the water packet of FIG. 1 in which the outer packet has been peeled back.

The present invention provides a water packet 1 with inner packet 2 contained within outer packet 5. Inner packet 2 contains potable water 3 trapped inside of itself and has a porous outer surface layer 4 that retains additional water. Porous outer surface layer 4 may be bonded to an outer surface of inner packet 2 or be formed as part of inner packet 2. Outer packet 5 both protects inner packet 2 and traps water inside of itself in porous outer surface layer 4. Both inner packet 2 and outer packet 5 can be envelopes with easy tear sections 8 or peel back edges 7 for ease of opening and they can be made of any suitable material, including plasticized paper, that is constructed (either through a waterproof liner 9 as in FIG. 6 or a coating layer or some other sealing mechanism) so that water is not allowed to pass through their walls, thus creating a sealed, double walled packet of potable water which can be cooled before opening with evaporative cooling.

Figure 4:
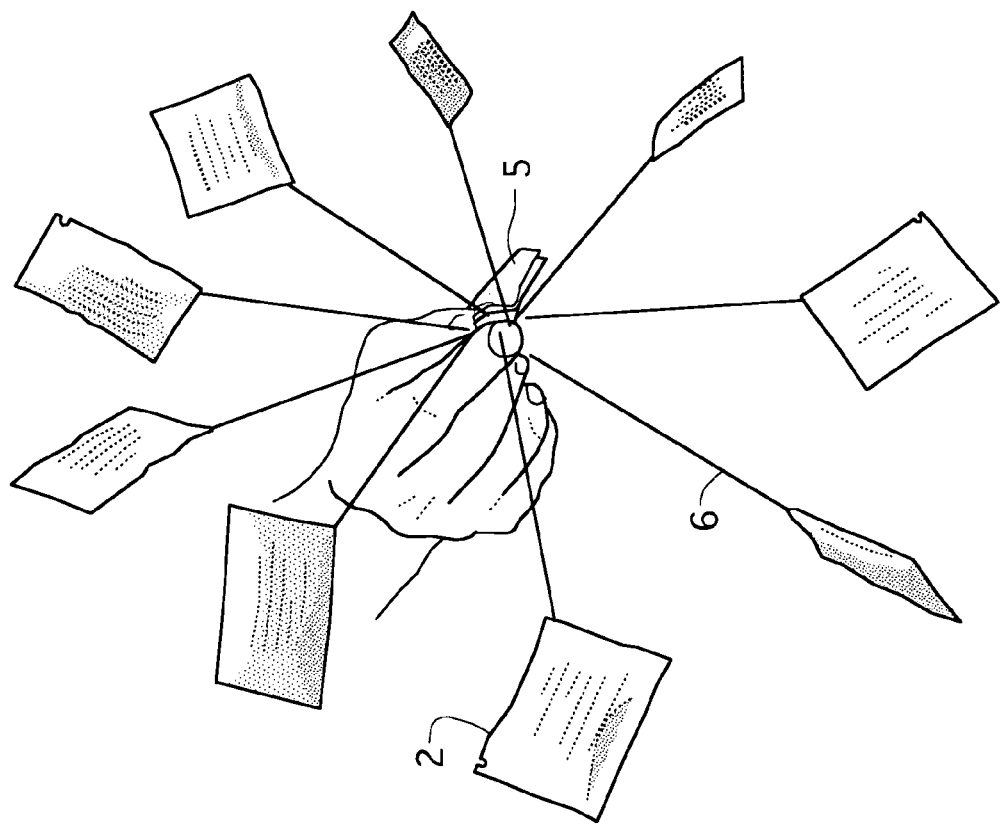
FIG. 4 illustrates the embodiment of FIG. 3 when it is being twirled by a user to cool the potable water in the inner packet.
Figure 3:
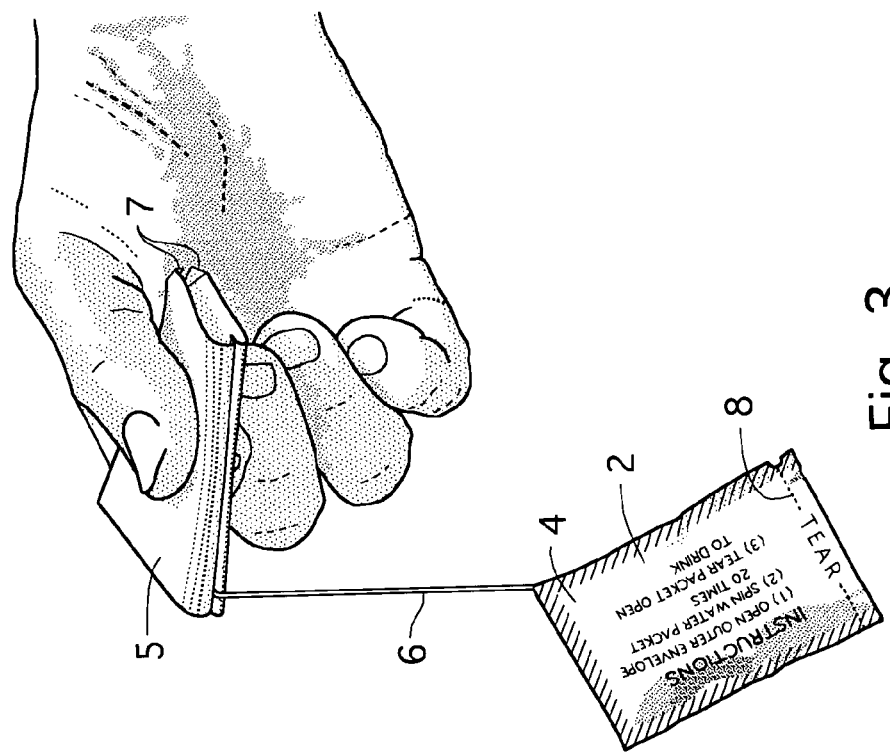
FIG. 3 illustrates an alternative preferred embodiment of the water packet of FIG. 1.

To use a water packet 1 of the present invention, a user first opens outer packet 5 and then rapidly causes water in outer surface layer 4 to evaporate to thereby cool potable water 3. Although it is not required that inner packet 2 be connected to outer packet 5, it is especially desirable that inner packet 2 be connected to outer packet 5 so that outer packet 5 can be used to rapidly wave or twirl inner packet 2 to cause water contained in porous outer surface layer 4 to rapidly evaporate. When water packet 1 is so constructed, use of outer packet 5 helps to keep fingers off of inner packet 2 and its porous outer surface layer 4. In addition, when a string 6 is used to connect inner and outer packets 2 and 5 together, outer packet 5 can be used to spin inner packet 2 as illustrated FIG. 4., and this can help create quite rapid evaporative cooling of potable water 3. After water has been evaporated from outer surface layer 4 and potable water 3 has been cooled, inner packet 2 is opened and its water is drunk. The evaporative cooling is most effective in hot, dry climates (where it will be especially appreciated) and hydrogel can be used in outer surface layer 4 to help prolong the evaporative cooling and thus further decrease the temperature of the potable water. (Hydrogel is a network of polymer chains that are water-insoluble, sometimes found as a colloidal gel in which water is the dispersion medium. Hydrogels are superabsorbent (they can contain over 99% water) natural or synthetic polymers.)

It is especially desirable that water packet 1 be constructed and sized so that evaporative cooling of water in outer surface layer 4 will significantly decrease the temperature of potable water 3 and, generally speaking, a greater surface area of outer surface layer 4 relative to the volume of potable water 3 will produce greater cooling. In an especially preferred embodiment of the present invention, inner packet 2 will contain one swallow of water (approximately ¾ of an ounce). Although this may seem like a very small amount of water to be worthwhile, when it is cooled and enjoyed in a very hot, dry climate, it is enough to be refreshing and rejuvenating; even more importantly, however, if a person is about to die for lack of water, one swallow of water as provided by the present invention may make the difference of surviving by prolonging life until a person can be rescued, especially for a soldier in a battlefield situation, such as a soldier in Iraq. Also, with this size, water packet 1 can be conveniently stored as a more or less flat envelope in a variety of locations, such as a shirt or pants pocket, where it can be readily accessed upon a moment's notice when such refreshment is needed, and the size is such that potable water 3 can be easily and quickly cooled.

While the invention has been described herein with reference to certain preferred embodiments, those embodiments have been presented by way of example only, and not to limit the scope of the invention. Additional embodiments and further modifications are also possible in alternative embodiments that will be obvious to those skilled in the art having the benefit of this description.

Accordingly, still further changes and modifications in the actual concepts described herein can readily be made without departing from the spirit and scope of the disclosed inventions as defined by the following claims.

What is claimed is:

1. A water packet comprising:
    an inner liquid impermeable packet filled with potable water, said packet being sealed, said inner packet further having a porous outer surface layer containing absorbed water;
    a sealed outer packet that encloses the inner packet and prevents evaporation of said absorbed water contained in the porous outer surface layer of the inner packet until said outer packet is opened and the inner packet is removed from the outer packet;
    and wherein said inner and outer packets are connected one to the other by a connection mechanism.

2. The water packet of claim 1, wherein the connection mechanism for connecting the inner packet to the outer packet is a connection having a first connection point to a first side of the inner packet and a second connection point to a second side of the outer packet.

3. The water packet of claim 1, wherein the connection mechanism for connecting the inner packet to the outer packet is a string connected at a first end to the inner packet and at its second end to the outer packet.

4. The water packet of claim 2 wherein the inner packet and outer packets are comprised of envelopes each having a tearable section for opening said envelopes.

5. A water packet comprising:
    a sealed inner liquid impermeable packet filled with potable water;
    at least a portion of an outer surface of said inner packet being covered with a porous material containing absorbed water to form an absorbent outer layer such that rapid evaporation of the absorbed water in said absorbent outer layer will cause said potable water to cool;
    and wherein a sealed outer packet encloses said inner packet to prevent evaporation of said absorbed water contained in the porous outer surface layer of the inner packet until said outer packet is opened and the inner packet is removed from the outer packet.

6. The water packet of claim 5, further comprising:
    a string connected at one end to the inner packet and at its other end to the outer packet.

7. The water packet of claim 5, wherein the inner and outer packets are connected.

8. The water packet of claim 5 wherein the inner packet and outer packets are comprised of envelopes.

9. The water packet of claim 8 wherein the outer packet has at least one peel back edge.

10. The water packet of claim 5, wherein the porous material is comprised of a hydrogel.

11. The water packet of claim 5, wherein the inner packet contains approximately one ounce of potable water.

12. A single use disposable water packet comprising:
    a sealed liquid impermeable inner packet containing potable water trapped within said inner packet;
    a porous outer surface layer formed on an outer surface of the inner packet retaining an additional amount of water;
    and a sealed outer packet encloses the inner packet trapping said additional amount of water retained in said porous outer surface until said outer packet is opened and said inner packet is removed from the outer packet;
    wherein rapid evaporation of the additional amount of water will cool the potable water trapped within the inner packet before the inner packet is opened.

13. The single use disposable water packet of claim 12, wherein the inner packet is sized so that evaporative cooling of the additional amount of water will significantly decrease the temperature of the potable water trapped within the inner packet.

14. The single use disposable water packet of claim 13, further comprising:
    a connector affixed at a first end to the inner packet and at a second end to the outer packet.

15. The single use disposable water packet of claim 13, wherein the connector is comprised of a string.

16. The single use disposable water packet of claim 13, wherein the inner packet and the outer packet are comprised of envelopes.

* * * * *